United States Patent Office 2,892,650
Patented June 30, 1959

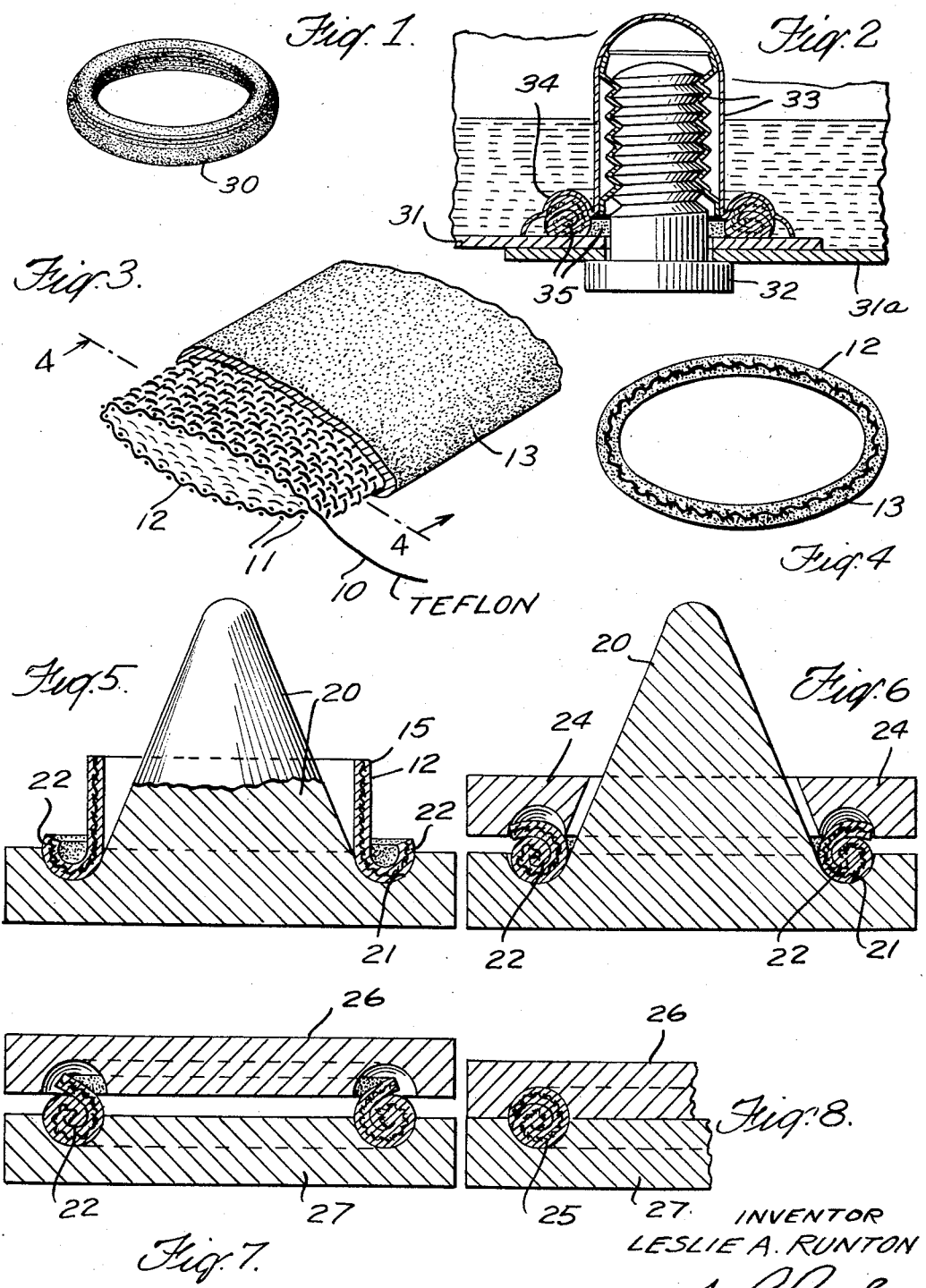

2,892,650
SEALING RING

Leslie A. Runton, Middle Haddam, Conn., assignor to The Russell Manufacturing Company, Middletown, Conn., a corporation of Connecticut Application May 20, 1957, Serial No. 660,276

2 Claims. (Cl. 288—33)

This invention relates to sealing rings of the type known as O rings and has for an object to provide a ring of the above type having novel and improved characteristics.

Another object is to provide a novel and improved method of making such a sealing ring.

Another object is to provide a sealing ring which will retain its sealing effect even when subjected to elevated temperatures and pressures for long periods of time.

Another object is to provide a sealing ring which is inert to various fluids.

Other objects and advantages will be apparent as the nature of the invention is more fully disclosed.

In accordance with the present invention continuous monofilament Teflon, a tetrafluoroethylene, is used as the sealing element. Teflon has the property of being inert to most fluids and in filament form has no "cold flow." That is, it retains its form when held under pressure for long periods of time. Several turns of the Teflon filament are wound in the form of a ring and are held in place by a warp yarn such as cotton which is capable of bonding to an impregnant or for certain purposes by a warp yarn such as Dacron which is resistant to high temperatures bonded by a cured or vulcanized rubberlike impregnant composed of natural or synthetic rubber such as latex or silicone rubber and is bonded by a heat set. The rubber does not bond to the Teflon but serves to hold the turns in place during use.

The nature of the invention will be better understood from the following description, taken in connection with the accompanying drawing in which a specific embodiment has been shown for purposes of illustration.

In the drawing:

Fig. 1 is a perspective view of an O ring embodying the invention;

Fig. 2 is a detail view of a portion of a feed tank showing the use of the sealing ring of Fig. 1;

Fig. 3 is a perspective view of a woven tube or sleeve from which the ring is formed;

Fig. 4 is a section taken on the line 4—4 of Fig. 3 but with the fabric opened up into circular form; and Figs. 5, 6, 7 and 8 are sectional views of forming dies illustrating successive steps in the formation of the ring.

Referring to the drawing more in detail a continuous, monofilament Teflon 10 is woven as filler with cotton or spun Dacron warp yarns 11 or the like in the form of a tube or sleeve 12 as shown in Fig. 4. The filler 10 is a continuous yarn which is woven in successive convolutions to form the tube 12. The fabric sleeve thus formed is impregnated with a suitable rubber-like impregnant 13, as above described.

For forming the O-ring a length 15 of the sleeve 12 is cut off and with the impregnant in tacky condition is applied over a cone die 20 having an annular groove 21 which is adapted to cause the lower edge of the sleeve to roll into the form of an annular bead 22 when the sleeve is pressed downwardly, as shown partly formed in Fig. 5. After the bead 22 has been formed it is loosely compacted by an upper die 24 as shown in Fig. 6 and is subjected to sufficient pressure to cause the impregnated bead to retain its shape during subsequent handling.

The compacted ring 25 is then removed from the die and is placed in a final die composed of upper and lower parts 26 and 27 respectively, as shown in Fig. 7. The ring is compacted under pressure to the desired size and shape in the step shown in Fig. 8 and is subjected to heat for setting and curing or vulcanizing the impregnant.

The final product is shown in Fig. 1 as a ring 30 composed of several parallel turns of Teflon which are held in place by the warp yarns 11 and by the cured impregnant. Even if the impregnant does not bond to the Teflon yarn it forms a pocket or cup for retaining the turns of Teflon in place, the Teflon forming the sealing element.

Fig. 2 shows one use of the O ring above described. In this figure a pair of lapped plates 31 and 31a which may form a part of an oil or fuel tank are held together under pressure by a bolt 32 extending through aligned holes in the two plates and threaded into a cap nut 33 inside the tank. The cap nut 33 is formed with an annular lip 34 in which an O ring 35 is seated in a position to be held in pressure engagement with the inner surface of the plate 31.

The O ring 35 serves as a seal to prevent liquid from passing through the bolt holes in the lapped plates and also serves to maintain a clamping pressure on the lapped plates so that they are held together in a liquid tight joint.

Since the Teflon has the property of not flowing under pressure the turns remain in place for sealing purposes and also continue to exert pressure on the plates throughout the required period of use even though the rubber-like impregnant may become released from the Teflon itself.

In the manufacture and storage of guided missiles and rockets, the question of permanently sealing liquids in tanks is a very critical problem and no O ring has heretofore been available which will withstand long periods of storage without compressing and flowing to the point where leakage of fuel occurs. The development of this type of O ring is especially aimed at overcoming this problem.

Obviously this embodiment is given only as one example of the many uses to which the O rings of the present invention may be put. Other uses and adaptations will be apparent to a person skilled in the art.

What is claimed is:

1. A sealing ring comprising a woven seamless annular fabric member having a continuous yarn composed of Teflon extending in successive turns around said annular member and warpwise yarns of a material capable of being bonded to an impregnant woven with said filler, said annular member being in the form of a bead with the turns of said filler lying in parallel relationship and with said warpwise yarns binding said filler yarns, and an impregnant in said fabric capable of bonding to said warpwise yarns, said impregnant being in the set and cured state and holding said turns in place.

2. A sealing ring as set forth in claim 1 in which said impregnant is a resin selected from the group consisting of natural and synthetic rubbers.

References Cited in the file of this patent
UNITED STATES PATENTS

| | | |
|---|---|---|
| 1,352,470 | Palmer | Sept. 14, 1920 |
| 1,734,470 | Kellogg | Nov. 5, 1929 |
| 2,754,848 | Knowland et al. | July 17, 1956 |
| 2,804,886 | White | Sept. 3, 1957 |

FOREIGN PATENTS

| | | |
|---|---|---|
| 16,212 | Great Britain | July 11, 1912 |